United States Patent [19]

Watanabe

[11] Patent Number: 4,649,437
[45] Date of Patent: Mar. 10, 1987

[54] PICTURE IMAGE FORMING APPARATUS

[75] Inventor: Junji Watanabe, Yokohama, Japan

[73] Assignee: Kabushiki Kaisha Toshiba, Japan

[21] Appl. No.: 797,468

[22] Filed: Nov. 13, 1985

[30] Foreign Application Priority Data

Nov. 14, 1984 [JP] Japan ................................. 59-240211

[51] Int. Cl.$^4$ ............................................. H04N 1/04
[52] U.S. Cl. ......................................... 358/286; 355/8;
358/285; 400/636.2; 400/187
[58] Field of Search ....................... 358/285, 256, 286;
400/185, 187, 636, 636.2; 355/8

[56] References Cited

U.S. PATENT DOCUMENTS

| 2,586,711 | 2/1952 | Potts | 358/285 X |
| 2,982,815 | 5/1961 | Buckingham et al. | 358/285 |
| 4,319,283 | 3/1982 | Ozawa et al. | 358/286 |
| 4,321,627 | 3/1982 | Hooker et al. | 358/286 |
| 4,500,197 | 2/1985 | Dannatt | 358/285 X |

Primary Examiner—Randall L. Green
Attorney, Agent, or Firm—Finnegan, Henderson, Farabow, Garrett & Dunner

[57] ABSTRACT

A picture image forming apparatus has a scanner for scanning a manuscript to read an image thereon and a printer. The apparatus is provided with a single source of driving power by which an optical system of the scanner and printing paper in the printer are respectively moved via first and second transmitting mechanisms.

11 Claims, 12 Drawing Figures

PICTURE IMAGE FORMING APPARATUS

BACKGROUND OF THE INVENTION

This invention relates to a picture image forming apparatus utilized as a printing device having a scanner.

Generally, a printer provided with a scanner is constructed to read picture information by scanning a manuscript with the scanner, and a thermal head in the printer generates heat based on the information to transfer printing ink of an ink ribbon and form a picture image.

The scanner comprises an optical system mounted on a carriage and the optical system is moved by the carriage to scan the manuscript. The printer comprises a platen which is rotated to convey printing sheets.

In conventional arrangements, the printer and scanner are driven by independent driving motors. This increased number of parts increases the cost of manufacturing and makes it difficult to miniaturize the apparatus.

SUMMARY OF THE INVENTION

It is an object of this invention to provide an improved picture image forming apparatus having a simplified driving means for the printer and the scanner.

It is another object of this invention to drive the printer and scanner by the same source of drive.

According to this invention, there is provided picture image forming apparatus comprising scanning means having an optical system, said scanning means for scanning a manuscript by moving an optical system to read picture information; and printing means for printing a picture image on printing paper based on the picture information; a single source of power for moving the optical system of the scanning means and for conveying the printing paper; a first power transmitting means for transmitting the driving power of the source of power to the scanning means; and a second power transmitting means for transmitting the driving power of the source of power to the printing means.

DESCRIPTION OF THE PREFERRED EMBODIMENT

Figure 1:
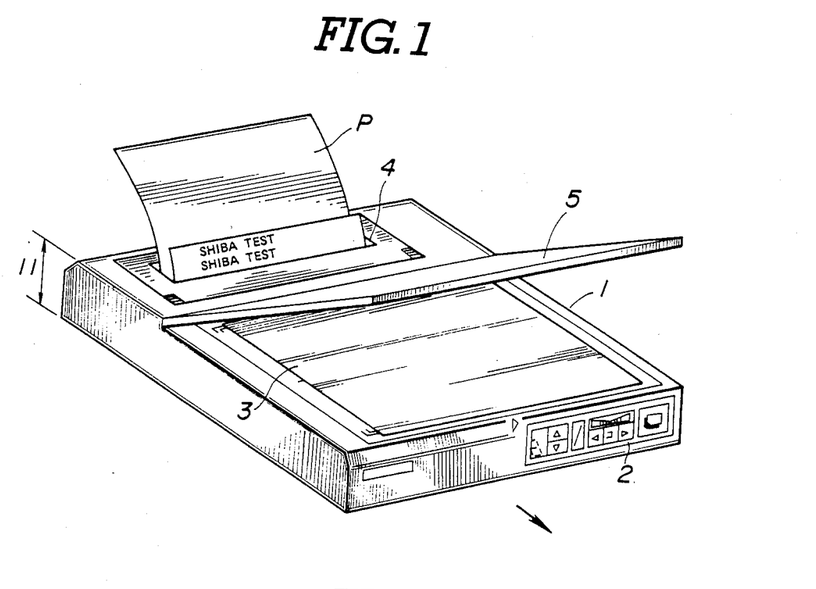
FIG. 1 is a perspective view showing a printer provided with a scanner to which the present invention is applied.

The picture forming apparatus shown in FIG. 1 comprises a casing 1. An operating panel 2 is mounted on the front side of the casing 1, the upper surface of the casing constitutes a manuscript supporting table 3, and a paper discharge opening 4 is provided to the rear side of the table 3, the manuscript supporting table 3 is covered by a cover 5.

Figure 2:
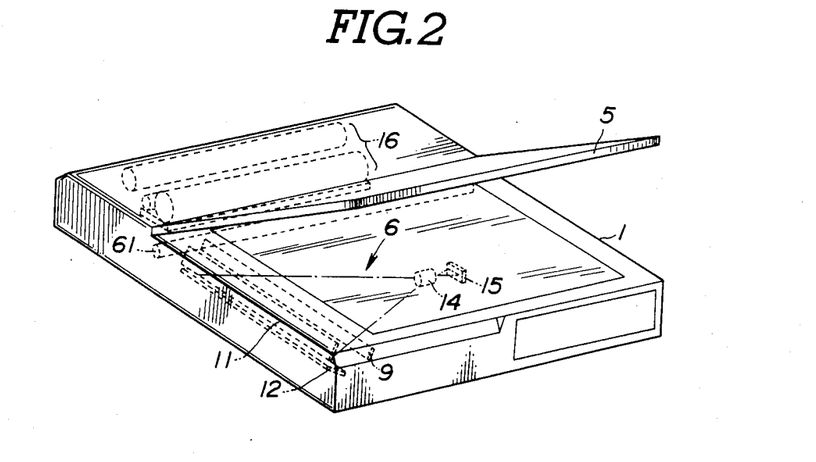
FIG. 2 is a perspective view showing the scanner and printer shown in FIG. 1.
Figure 3:
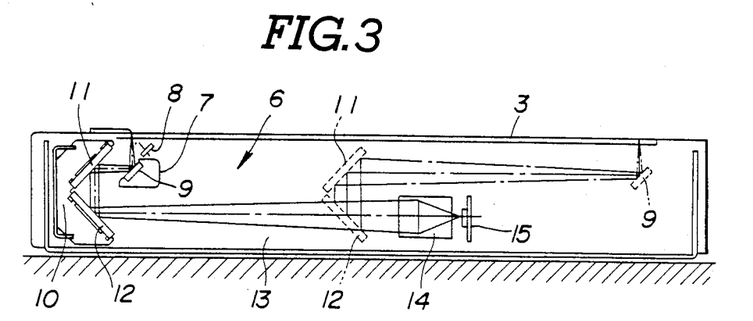
FIG. 3 is a side view showing the detail of the scanner shown in FIG. 2.

As shown in FIGS. 2 and 3, a scanner 6 is contained in the casing 1 beneath the manuscript supporting table 3. More particularly, the scanner 6 comprises a first carriage 7 carrying a lamp 8 and a first mirror 9, and a second carriage 10 carrying second and third mirrors 11 and 12. The light 13 reflected by the third mirror 12 is projected on a CCD (charge coupled device) 15 through a lens 14.

Figure 5:
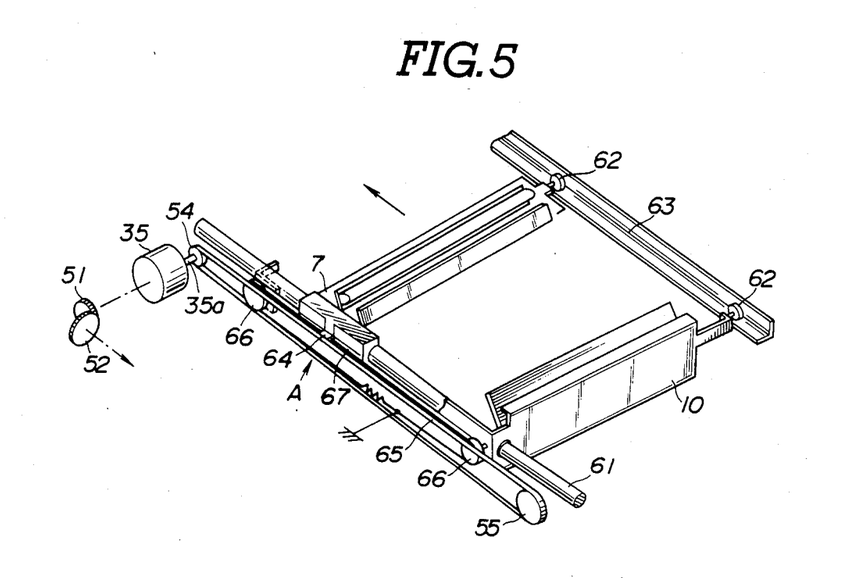
FIG. 5 is a perspective view showing a carriage and its driving system.
Figure 6:
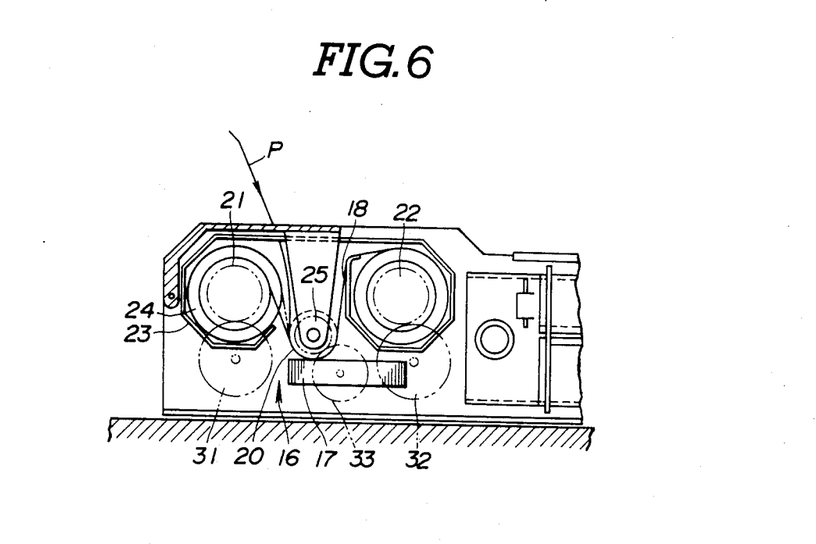
FIG. 6 is a side view showing the detail of the printer.
Figure 7:
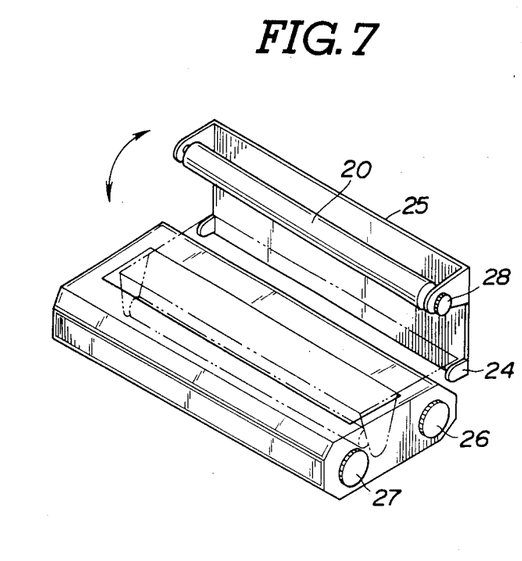
FIG. 7 is a perspective view showing a cassette.

As shown in FIG. 5, one ends of the first and second carriages 7 and 10 are slidably carried by a rail 61, while the other ends are supported by a guide member 63 through rollers 62. The carriages 7 and 10 are driven by one shaft 35a of a reversible pulse motor 35 through a power transmission means A. More particularly, one end of the first carriage 7 is connected to an endless belt 65 and a wire 67 through a connector 64. The endless belt 65 is passed about pulleys 54 and 55, while the wire 67 is passed about idle rollers 66 connected to the second carriage 10. The pulley 54 at one end of the endless belt 65 is connected to the shaft 35a of the pulse motor 35.

For the purpose of maintaining the length of the optical path at a constant value, the second carriage 10 is moved at a half speed of the first carriage 7.

By the movement of the first and second carriages 7 and 10, the manuscript G mounted on the manuscript supporting table 3 is scanned with light and the light reflected from the manuscript is projected to the CCD 15 through first to third mirrors 9, 11 and 12 and lens 14, to form a picture image.

Figure 4:
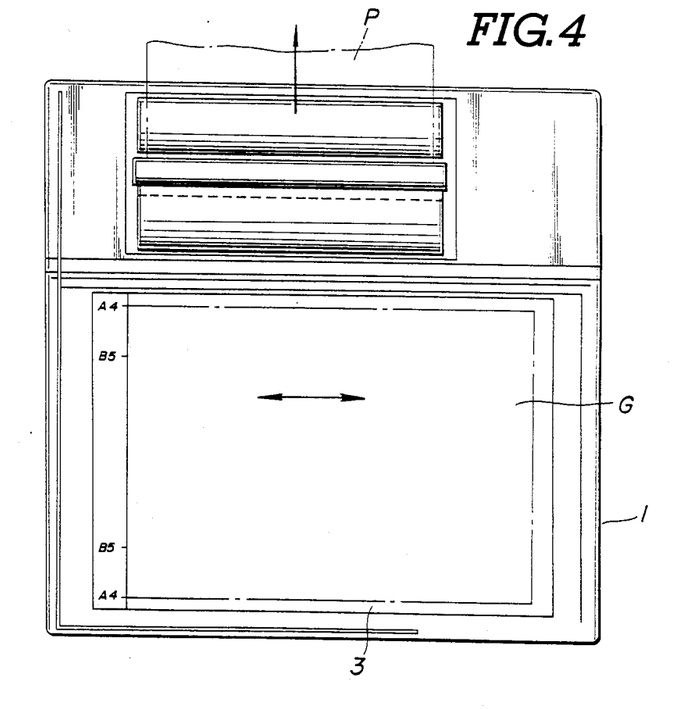
FIG. 4 is a plan view showing the direction of scanning and the direction of conveyance of the copying paper.

A printer 16 as shown in FIGS. 6–9 is disposed to the rear side of the scanner 6. More particularly, the printer 16 comprises a thermal head 17 acting as a recording head which is urged against a platen 20 via an ink donor medium or an ink ribbon 18 and a printing paper P. The thermal head 17 is provided with a number of heat generating elements which are selectively energized according to an image on a document, and the printing paper P is coated with heat fusible ink. The printing paper P is conveyed by the rotation of the platen 20 in a direction perpendicular to the direction of scanning as shown by arrows shown in FIG. 4. The opposite ends of the ink ribbon 18 are wound around winding cores 21 and 22 respectively, which are contained in an exchangeable cassette 23. The platen 20 is positioned between winding cores 21 and 22 at a lower position. The platen 20 is supported by a holder 25 rotatable about a pivot pin 24 so that the platen 20 can be brought into an operative position by the rotation of holder 25. When the holder 25 is rotated to an opened position, the cassette 23 can be mounted and dismounted.

Figure 8:
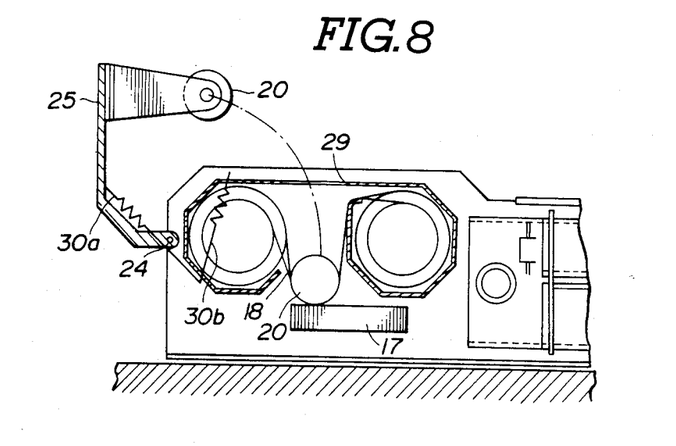
FIG. 8 is a perspective view showing a state in which a cassette holder has been released.

As shown in FIG. 8, an opening 29 is formed on the upper portion of the cassette 23, and platen 20 is inserted into the cassette through opening 29 for urging the ink ribbon 18 against thermal head 17. Under this state, the platen 20 is urged against thermal head 17 by the force of spring 30b, while opening of the holder 25 is assisted by a spring 30a.

Figure 9:
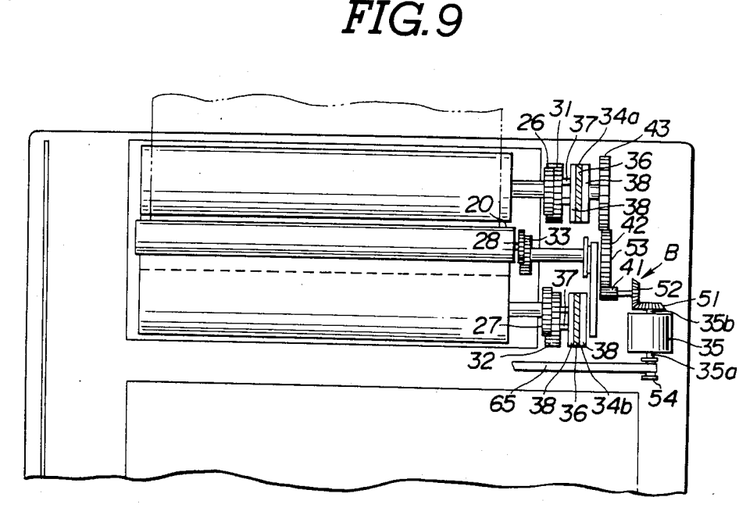
FIG. 9 is a plan view showing a driving system of the printer embodying the invention.

As shown in FIG. 9, one ends of winding cores 21 and 22 and platen 20 are connected to the other shaft 35b of the pulse motor 35 through a second power transmitting means B. More particularly, gears 26 and 27 are secured to one end of winding cores 21 and 22 respectively, and a platen driving gear 28 is secured to one end of platen 20, the gears 26, 27 and 28 mesh with gears to be described later. More particularly, as shown in FIG. 9, gears 26 and 27 of the cassette 23 respectively mesh with gears 31 and 32, and the platen driving gear 28 meshes with a gear 33. Friction clutches 34a and 34b are mounted on the shafts of gears 31 and 32 for transmitting the power of the pulse motor 35 at a constant frictional torque. Generally, each of the friction clutches 34a and 34b is constructed to urge flat discs 38 against a felt disc 36 interposed therebetween by a spring 37.

Figure 10:
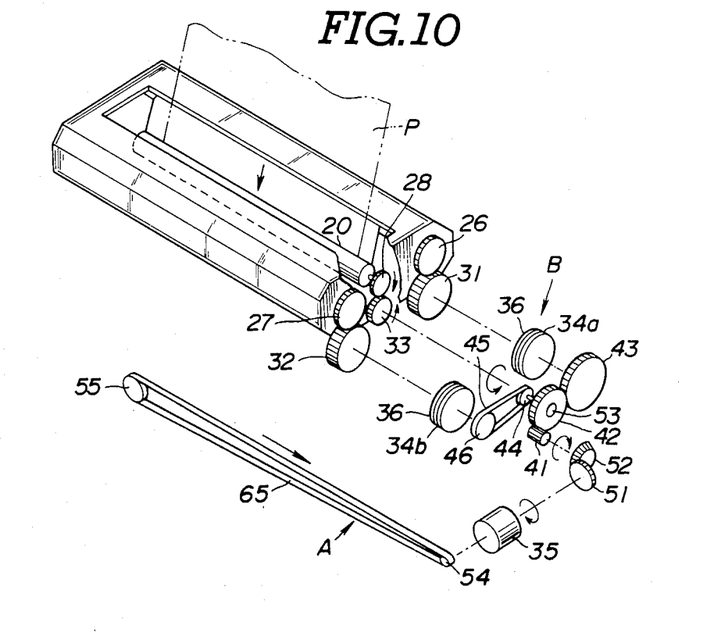
FIG. 10 is an exploded perspective view of the driving system shown in FIG. 9.

As shown in FIGS. 9 and 10, a gear 51 is secured to the other shaft 35b of the pulse motor 35 for driving a gear 43 via gears 52, 41 and 42. As shown in FIG. 10, a gear 42 is provided with an one way clutch 53 for transmitting the rotation of motor 35 in only one direction. The gear 43 is connected to the friction clutch 34a, while the gear 42 is connected to a pulley 40 which is connected to the gear 33 and to the friction clutch 34b through a belt 45 and the pulley 40.

Figure 11:
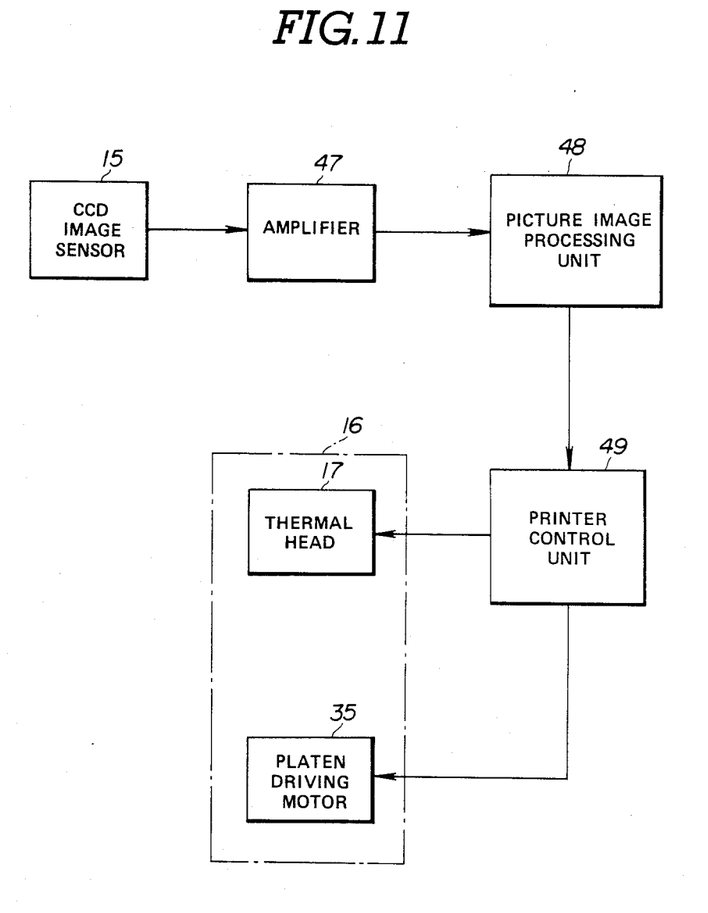
FIG. 11 is a block diagram showing a control system employed in this invention.

As shown in FIG. 11, the CCD 15 of the scanner 6 is connected to a picture image processing unit 48 via an amplifier 47. The picture image processing unit 48 is connected to the thermal head 17 and the platen driving motor 35 of printer 16 so that the thermal head 17 and the driving motor 35 are operated in accordance with picture image information.

The driving system of the scanner 6 and the printer 16 described above operates as follows:

Assume now that the motor 35 of the driving system rotates in a direction shown by an arrow in FIG. 10. Then the platen 20 is rotated through the gears 51, 52, 41, 42, pulley 44, gear 33 and platen driving gear 28, and the winding core 22 is rotated through the gears 51, 52, 41 and 42, pulley 44, belt 45, pulley 46, friction clutch 34b, gears 32 and 27, while the winding core 21 is rotated through the gears 51, 52, 42 and 43, the friction clutch 34a and the gears 31 and 26. Due to the rotation of the platen 20, the printing paper P is conveyed, and due to the rotation of the winding cores 21 and 22, the ink ribbon is taken up.

Figure 12:
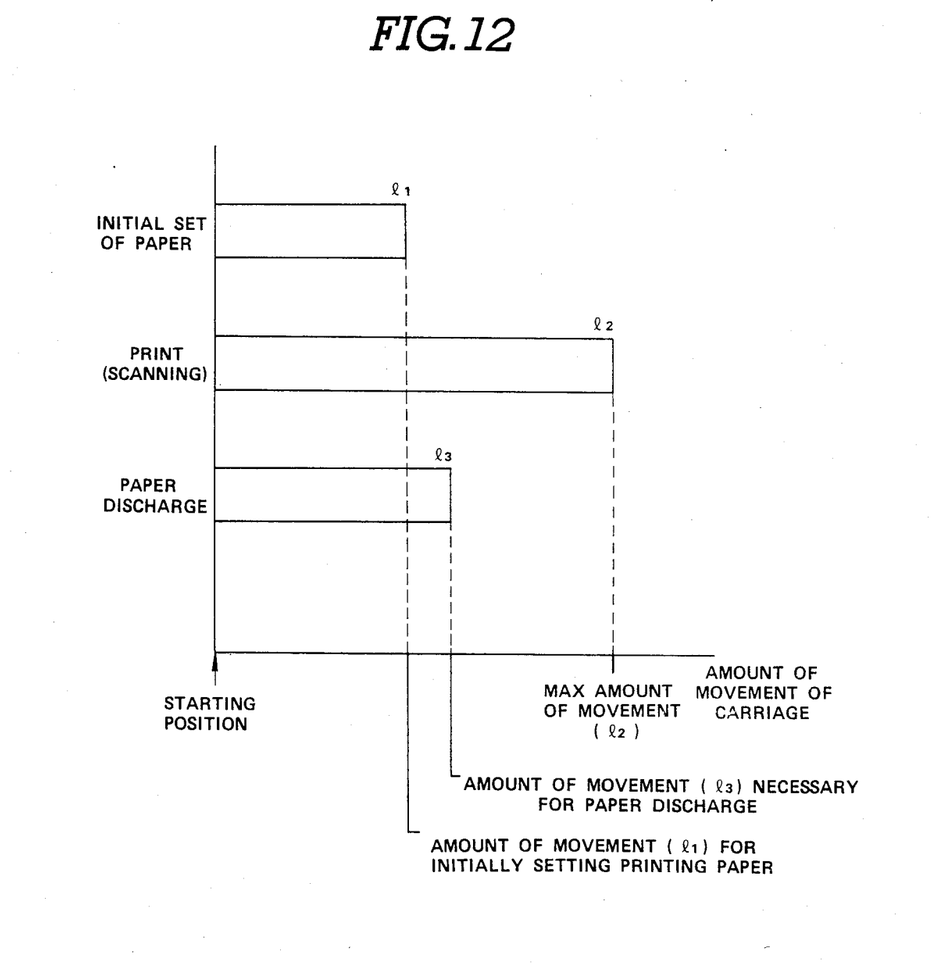
FIG. 12 is a graph showing the relation between the printing paper and the scanning operation.

As shown in FIG. 12, as the printing paper P is moved by a distance l₁, it is set to the initial position, and as the paper P is moved by a distance l₃, it is discharged.

At this time, a pulley 54 of the other shaft 35a of the motor 35 is also rotated to run the endless belt 65 so that the first and second carriages 7 and 10 are moved by a distance l₂ shown in FIG. 12 so that the manuscript G on the manuscript supporting table 3 is scanned.

When the motor 35 is rotated in the reverse direction, the gear 42 becomes idle due to the action of the one way clutch 53 of the gear 42 whereby the rotation of the winding cores 21 and 22 is stopped and only the endless belt 65 is runned to move the first and second carriers 7 and 10 are moved in the opposite direction toward the reset position.

According to this invention, the printer 16 and scanner 6 can be operated by the same motor 35. Accordingly, it is not necessary to drive them by individual motors, thereby simplifying the construction.

It should be understood that, the invention is not limited to the specific embodiment described above and that many changes and modifications will be obvious to one skilled in the art without departing the true spirit and scope of the invention as defined in the appending claims.

What is claimed is:

1. Picture image forming apparatus comprising:
    scanning means for scanning a manuscript to read picture information and including a first carriage for carrying a first mirror for reflecting light reflected from said manuscript in a direction substantially parallel with said manuscript, said first carriage moving said first mirror at a first speed with respect to said manuscript, a second carriage for carrying second and third mirrors for reflecting light reflected by said first mirror in a direction substantially parallel with said reflected light, said second carriage moving said second and third mirrors with respect to said manuscript at a second speed one half of said first speed, and optical reading means for reading out a picture image of said manuscript from light reflected by said third mirror;
    printing means for printing a picture image on a printing paper based on said picture information;
    a single source of power for moving said scanning means and for conveying said printing paper;
    first power transmitting means for transmitting the driving power of said source of power to said scanning means; and
    second power transmitting means for transmitting the driving power of said source of power to said printing means.

2. The apparatus according to claim 1 wherein said first power transmitting means transmits the driving power of said source of power to said first and second carriages.

3. The apparatus according to claim 1 wherein said first power transmitting means comprises wire means for transmitting the driving power of said source of power to said first and second carriages such that said first carriage is moved at a speed one half of that of said second carriage.

4. The apparatus according to claim 1 wherein said source of power comprises a reversible pulse motor.

5. Picture image forming apparatus comprising:
    scanning means for scanning a manuscript to read picture information;
    printing means for printing a picture image on a printing paper based on said picture information, said printing means including an ink donor medium, a pair of winding cores connected to opposite ends of said ink donor medium, a printing head, and a platen roller for urging a printing paper against a printing head through said ink donor medium to convey said printing paper;
    a single source of power for moving said scanning means and for conveying said printing paper;
    first power transmitting means for transmitting the driving power of said source of power to said scanning means; and
    second power transmitting means for transmitting the driving power of said source of power to aid printing means.

6. The apparatus according to claim 5 wherein said ink donor medium comprises an ink film on which heat fusible coloring agent is coated and said printing head comprises a thermal head including a plurality of heat generating elements which are selectively energized in accordance with said picture information.

7. The apparatus according to claim 5 wherein said second power transmitting means comprises a one way clutch for transmitting the driving force of said source of power in only one direction, and transmits said driving force to said pair of winding cores and said platen roller via said one way clutch.

8. The apparatus according to claim 5 wherein one of said winding cores taking up said ink donor medium is driven through a first friction clutch in the same direction as said platen roller, and the other winding core paying out said ink donor medium is driven through a second friction clutch in a direction opposite to that of said platen roller.

9. Picture image forming apparatus comprising:
- a first carriage for carrying a light source for irradiating a manuscript and a first mirror for reflecting light reflected from said manuscript in a direction substantially parallel with said manuscript, said first carriage being moved at a first speed with respect to said manuscript;
- a second carriage for carrying second and third mirrors for reflecting light reflected by said first mirror in a direction substantially in parallel with said reflected light, said second carriage being moved at a second speed one half of said first speed;
- photoelectric readout means for reading out a picture image of said manuscript from light reflected by said third mirror;
- a pair of winding cores connected to opposite ends of an ink film on which heat fusible ink is coated;
- a thermal head including a plurality of heat generating elements selectively energized in accordance with said picture image;
- a platen roller for urging a printing paper against said thermal head through an ink donor medium and for conveying said printing paper;
- a single reversible pulse motor;
- first power transmitting means for transmitting rotation of said pulse motor to said first and second carriage such that said second carriage is moved at a speed one half of that of said first carriage;
- an one way clutch for transmitting rotation of said pulse motor to said platen in only one direction; and
- a second power transmitting means for transmitting rotation in one direction of said pulse motor to said platen roller through said one way clutch and for rotating said pair of winding cores in different directions through said one way clutch and friction clutches.

10. The apparatus according to claim 9 wherein one ends of said first and second carriages are guided by guide means, and the other ends are driven by said pulse motor through a belt.

11. The apparatus according to claim 9 wherein said platen roller and said pair of winding cores taking up said ink donor medium are contained in a cassette which is removably mounted in a casing of said apparatus.

* * * * *